United States Patent

[11] 3,610,965

[72] Inventors Harold M. Martin
South Houston;
Timothy A. O'Neill, Houston, both of Tex.

[21] Appl. No. 833,041
[22] Filed June 13, 1969
[45] Patented Oct. 5, 1971
[73] Assignee Shell Oil Company
New York, N.Y.

[54] INTEGRATED FLIP-FLOP CIRCUIT
14 Claims, 5 Drawing Figs.

[52] U.S. Cl. ........ 307/279, 307/220, 307/246, 307/265, 307/289, 328/41, 328/58, 328/122, 328/206
[51] Int. Cl. ........ H03k 3/26
[50] Field of Search ........ 307/279, 220, 238, 246, 247, 265, 269, 289, 221 C; 328/41, 58, 66, 122, 206

[56] References Cited

UNITED STATES PATENTS

| | | | |
|---|---|---|---|
| 3,363,115 | 1/1968 | Stephenson et al. | 307/220 X |
| 3,369,130 | 2/1968 | Stern | 307/247 |
| 3,459,962 | 8/1969 | Bell | 307/220 |
| 3,469,109 | 9/1969 | Schrecongost | 307/220 |
| 3,514,765 | 5/1970 | Christensen | 307/279 X |
| 3,518,635 | 6/1970 | Cole et al. | 307/279 X |

*Primary Examiner*—Stanley T. Krawczewicz
*Attorneys*—Theodore E. Bieber and J. H. McCarthy

ABSTRACT: A MOSFET flip-flop circuit consisting of a slave circuit formed of a pair of cross-coupled MOSFETs and a master circuit connectable to the slave circuit by the trigger pulse is disclosed. Precharging of the slave and master circuits can be accomplished by a system clock or by DC. By substituting an analog voltage for the precharging voltage on one or both sides of the master circuit, the output pulse length and output pulse interval can be separately regulated over a considerable range of integral numbers of trigger pulses. Several flip-flop circuits can be connected through MOSFET gates to produce a binary counter.

INVENTORS
HAROLD M. MARTIN
TIMOTHY A. O'NEILL
BY
Mellin, Moore & Weissenberger
ATTORNEYS INVENTORS
HAROLD M. MARTIN
TIMOTHY A. O'NEILL
BY
Mellin, Moore & Weissenberger
ATTORNEYS INVENTORS
HAROLD M. MARTIN
TIMOTHY A. O'NEILL
BY
Mellin, Moore & Weissenberger
ATTORNEYS INVENTORS
HAROLD M. MARTIN
TIMOTHY A. O'NEILL
BY
Mellin, Moore & Weissenberger
ATTORNEYS

INTEGRATED FLIP-FLOP CIRCUIT

BACKGROUND OF THE INVENTION

The development of microcircuits composed of field-effect transistors and electrical interconnections formed on a single silicon chip has opened many new avenues in the microminiaturization of computer equipment. In circuits of this type, the switching action of the circuit is accomplished by charging and discharging the gate capacitances of the MOSFET (metal oxide silicon field effect transistor) switching elements and the line capacitances between the interconnecting leads and the grounded substrate.

The present invention has for its object to provide a circuit of this nature which is capable of acting as an unusually versatile flip-flop circuit.

SUMMARY OF THE INVENTION

Basically, the invention provides a cross-connected pair of slave MOSFETs and a pair of master MOSFETs, the slave and master being so interconnected that the slave and master exchange conductivity states whenever a conductivity path between them is established by means of a trigger pulse. Both the master and the slave circuits are prepared for a switching action by precharging means.

In accordance with a further aspect of the invention, control of the master circuit precharge rates by a judicious choice of precharge voltages and master circuit RC constants provides accurate and independent control of the output pulse length and pulse interval over a considerable range of integral numbers of trigger pulses. By the use of variable analog master precharge voltages, the pulse length and interval are readily adjustable or can be made subject to an automatic external control.

The invention further expands the inventive concept of a single flip-flop into an all-MOSFET binary counter.

It is therefore the object of the invention to provide a MOSFET flip-flop circuit.

It is another object of the invention to provide a flip-flop circuit in which the output pulse length and interval are readily variable over a wide range of integral numbers of trigger pulses.

It is a further object of the invention to provide an all-MOSFET binary counter.

DESCRIPTION OF THE PREFERRED EMBODIMENTS

Figure 1:
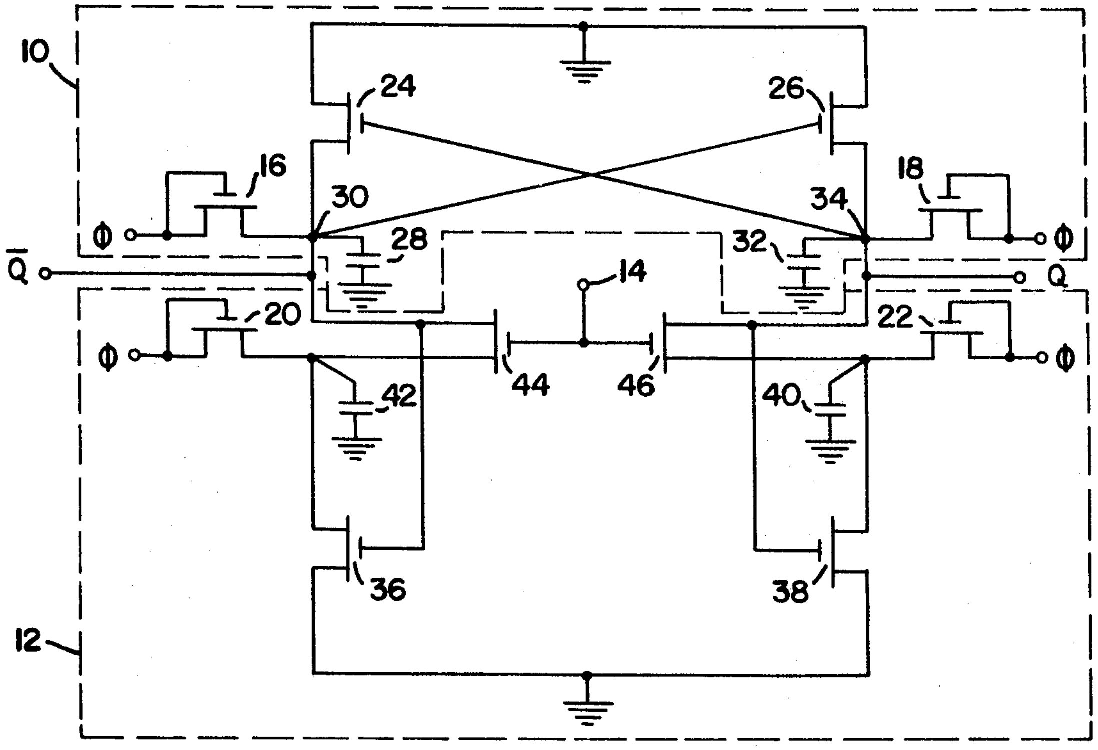
FIG. 1 is a circuit diagram of a basic MOSFET flip-flop.

In FIG. 1, the slave circuit is generally shown at 10, and the master circuit is generally shown at 12. The output of the circuit is of the double rail type and consists of the output rail Q and the inverted output rail $\overline{Q}$. The input of the circuit consists of clocked trigger pulses applied to input 14. The circuit of FIG. 1 is precharged by a system clock Φ (which may be either a DC voltage, or a clock voltage pulsed in alternation with the trigger pulses) through precharge gates 16, 18 in the slave circuit and 20, 22 in the master circuit.

The slave circuit storage elements are the cross-connected MOSFETs 24, 26. Capacitor 28 represents the gate-to-ground capacitance of the gates of MOSFET 26 and 36, plus the total line capacitance of the various connecting leads connected to point 30. Likewise, the capacitor 32 represents the gate-to-ground capacitance of MOSFETs 24 and 38 plus the total line capacitance of the interconnecting leads connected to point 34.

The operation of the circuit is as follows:

Let it be assumed that in the beginning, the circuit is in the "1" condition, in which the rail Q is at logic "1" and the rail $\overline{Q}$ at logic "0." In this condition, MOSFET 24 conducts, and MOSFET 26 is cut off. During the clock pulse (or during the entire time during which the circuit remains in this condition when the clock input is DC MOSFETs 16 and 24 constitute a voltage divider between the clock input Φ and ground. The representative conductances of MOSFETs 16 and 24 are made such that point 30 is maintained at a level below the threshold of MOSFET 26 as long as the voltage divider action persists. The fact that point 30 is below threshold and point 34 is at logic "1" causes MOSFET 36 to be cut off while MOSFET 38 is enabled.

The enabled MOSFET 38 creates another voltage divider action between the clock input Φ and ground through MOSFETs 22 and 38. The conductances of MOSFETs 22 and 38 are made such that as long as this voltage divider action persists, capacitor 40 remains essentially discharged, i.e., at a level well below threshold.

To

During this time, the blocking of MOSFET 36 causes capacitor 42 to be connected directly to the system clock input Φ through MOSFET 20, and consequently capacitor 42 is charged essentially to logic "1."

When a trigger pulse is now applied to the input 14, the transfer gates 44, 46 are enabled and the master circuit is connected to the slave circuit. Capacitor 42 thereupon dumps its charge through MOSFET 44 into capacitance 28. Capacitance 28 being made at least an order of magnitude smaller than capacitance 42, capacitance 28 rapidly charges beyond threshold without substantially depleting the charge on capacitor 44. This causes MOSFET 26 to be enabled, and a voltage divider action is set up through MOSFETs 26 and 18. At the same time, the enabling of MOSFET 46 dumps the charge of capacitance 42 into the much larger capacitor 40, and MOSFET 24 cuts off.

The slave has now reversed its condition, and the Q output has gone to logic "0" while the $\overline{Q}$ output has gone to logic "1." The logic "1" state now existing at point 30 enables MOSFET 36, while the logic "0" state at point 34 cuts off MOSFET 38. As a result, the voltage divider action between MOSFET 22 and 38 ceases, and capacitor 40 charges to logic "1." At the same time, voltage divider action is established through MOSFETs 20 and 36, and capacitor 42 is brought essentially to logic "0." The action is now ready to repeat itself, and the next trigger pulse to input 14 returns the circuit to its original condition.

Figure 2:
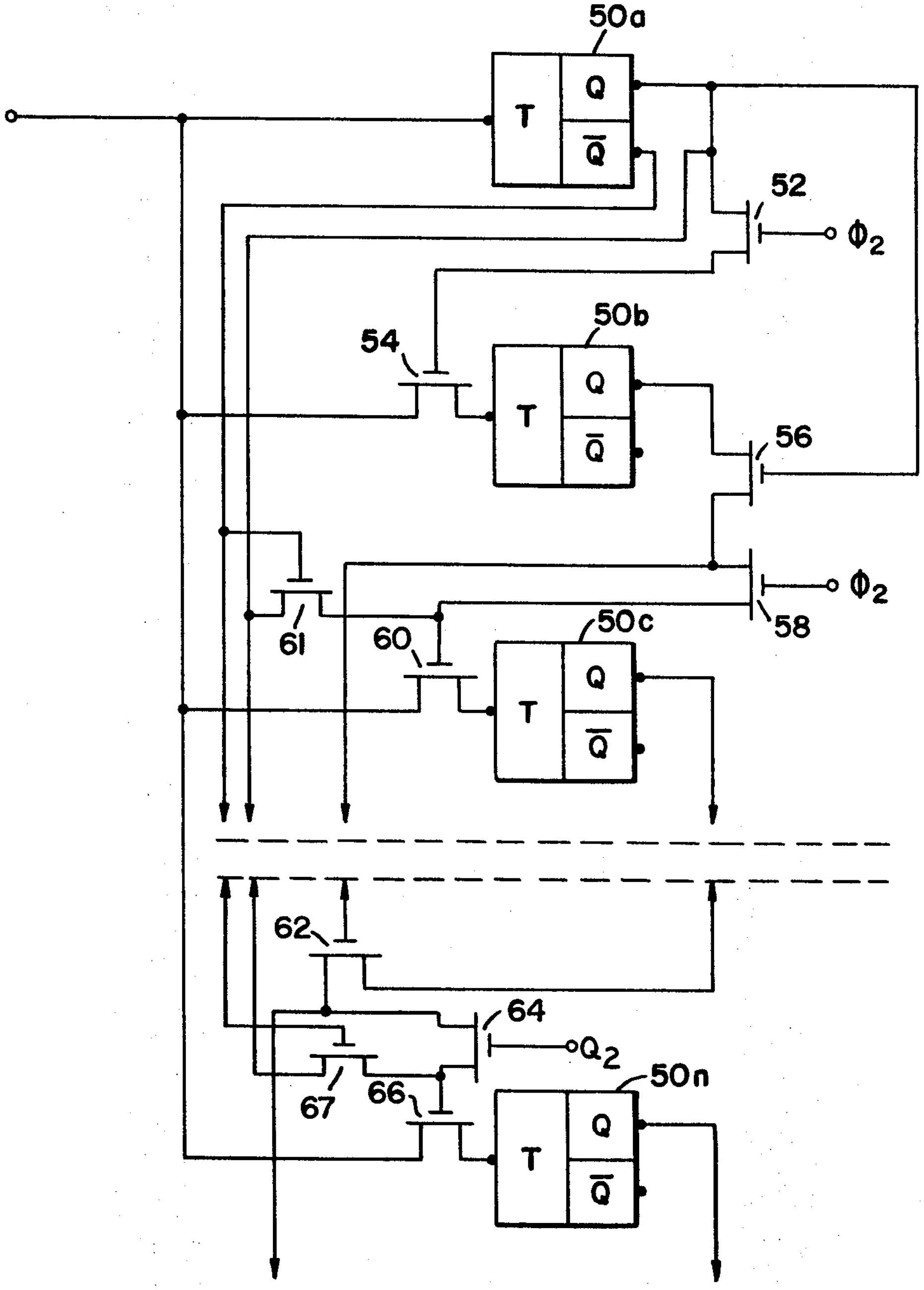
FIG. 2 is a diagrammatic representation of a counting circuit using a series of the circuits of FIG. 1 to perform a binary counting action.
Figure 3:
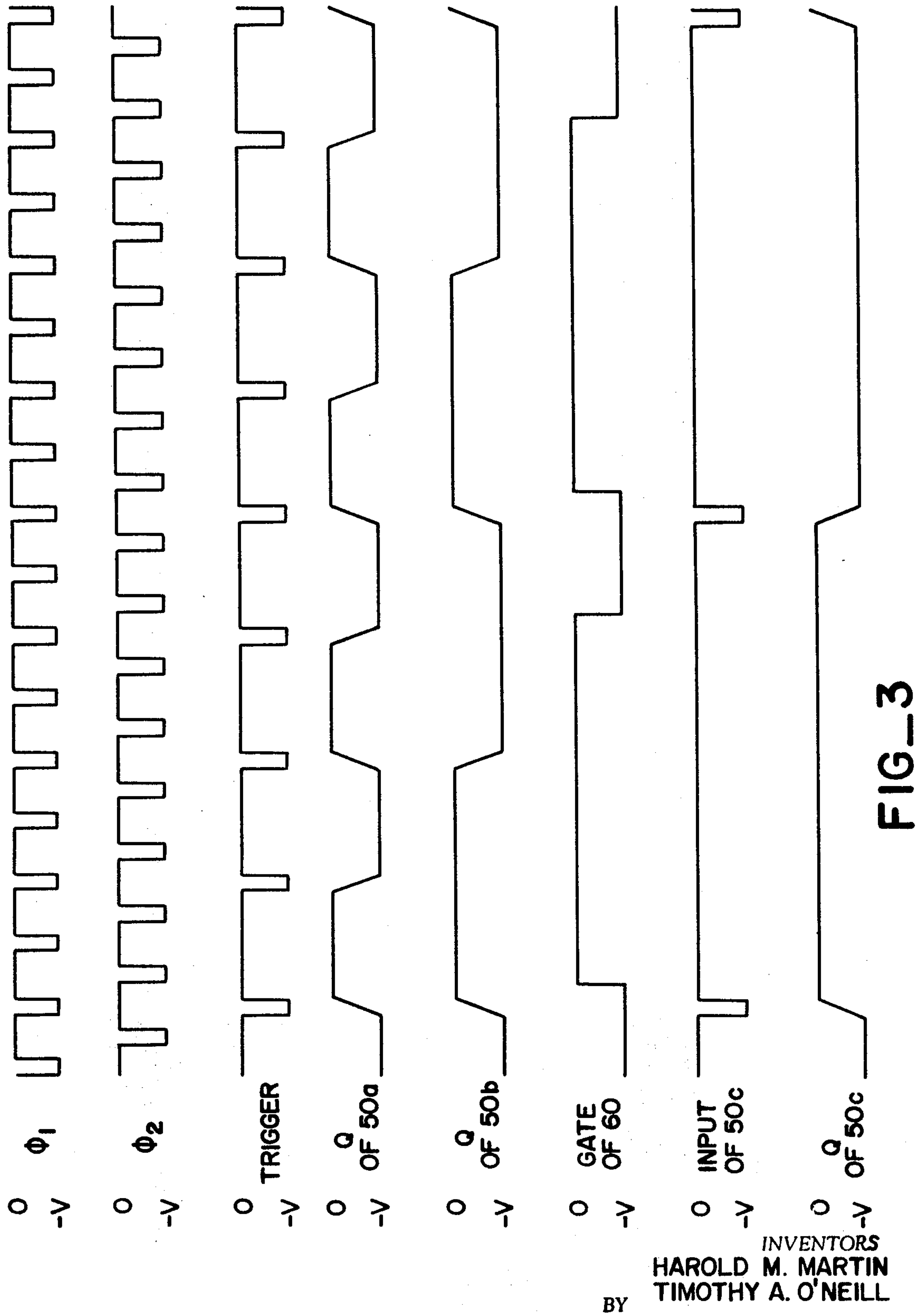
FIG. 3 is a time amplitude diagram illustrating the wave forms at various points in the control of FIG. 2.

FIG. 2 illustrates the manner in which the circuit of FIG. 1 can be used to form a binary up-counter. In this embodiment, the system clock Φ of FIG. 1 applied to the precharging MOSFETs 16, 18, 20, 22 of each flip-flop stage is designated as $\Phi_1$. A second system clock occurring between each trigger pulse is designated $\Phi_2$.

The circuit of FIG. 2 functions in the following manner:

The plurality of flip-flop circuits **50*a* through 50*n* each have a system clock input $\Phi_1$, a trigger input T, and a double rail output Q and $\overline{Q}$. The Q output of lowest order flip-flop 50*a* is connected through $\Phi_2$-enabled timing gate 52 to the gate of trigger inhibitor 54**.

Assuming that the counter starts from 0, the first trigger pulse flips the flip-flop **50*a* to the "1" condition. Following the end of the trigger pulse, the occurrence of the $\Phi_2$ pulse transfers the resulting "1" condition of output Q to the gate of inhibitor 54. With inhibitor 54 now enabled, the next trigger pulse switches 50*b* to the "1" condition and simultaneously returns flip-flop 50*a* to the "0" condition. The next occurrence of the transfer pulse $\Phi_2$ transfers that "0" condition of output Q of flip-flop 50***a* to the gate of inhibitor 54 and prevents fliphflop 50*b* from being actuated by the third trigger pulse.

The output of the Q rail of second-order flip-flop 50*b* is transmitted during $\Phi_2$ through setting gate 56 and timing gate 58 to the inhibitor 60. Consequently, it will be seen that flip-flop 50*c* can be triggered only after flip-flop 50*a* and 50*b* are both in a "1" condition. After $\Phi_2$, inhibitor 60 remains in the condition in which it was during $\Phi_2$ because of the storage effect of the gate-to-ground capacitance of the gate electrode of inhibitor 60.

Tp prevent inhibitor 60 from remaining enabled when its gate supply circuit is broken by the blocking of gate 56, a resetting gate 61 is connected between the gate electrode of inhibitor 60 and the $\overline{Q}$ rail of the lowest-order flip-flop 50*a*. The resetting gate 61 is enabled by the Q rail of the lowest-order stage 50*a*. Thus, when the flipping of third-order flip-flop 50*c* to the "1" condition returns all lower-order flip-flops to "0," resetting gate 61 is enabled and the logic "0" condition of the Q rail of the lowest-order flip-flop 50*a* cuts inhibitor 60 off.

In the *n*th-order stage, it will be seen that gate 62 is enabled only when all flip-flops from 50*a* through 50*n*–2 are in the "1" condition, and that the "1" condition of the flip-flop *n*–1 is required to produce a logic "1" which can be transferred through setting gate 62 and timing gate 64 to the gate of inhibitor 66. A resetting gate 67 is provided in the *n*th-order stage for the same purpose as described above in connection with the third-order stage.

Consequently, it will be seen that the interconnection between flip-flop 50*a* and 50*b* requires two MOSFETs and that every higher-order interconnection requires four MOSFETs each. When all flip-flops are at "1," the next trigger pulse will of course reset all flip-flops to "0."

The circuit of FIG. 1 has an intriguing property which makes it extremely versatile. Whereas the discharge rate of capacitors 40, 42 is quite rapid due to the low impedance of MOSFETs 36, 38, the charging rate of these capacitors can be controlled over a wide range by an appropriate selection of the RC time constant established by the impedance of precharge gate 22 or 20 and the capacitance of capacitors 40 or 42, respectively, and of the precharge voltage.

Figure 5:
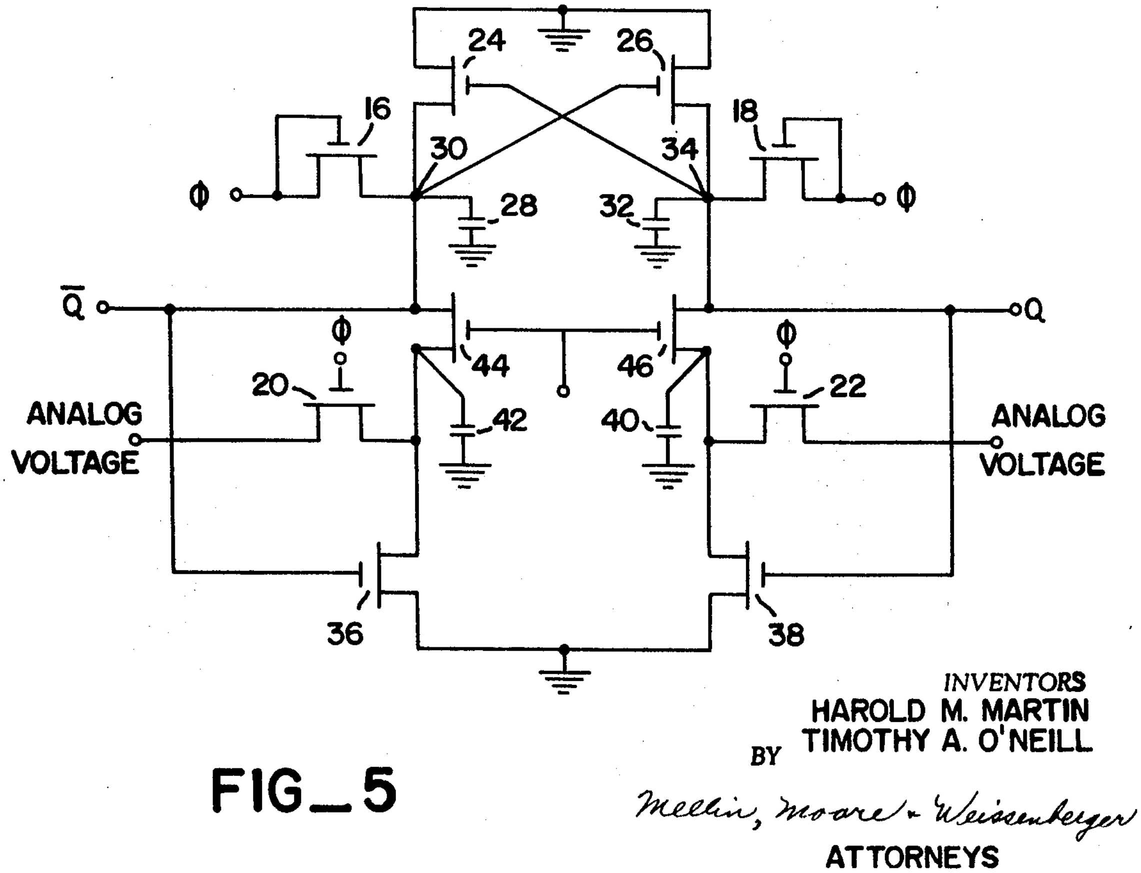
FIG. 5 is a circuit diagram similar to FIG. 1 but showing an alternative connection of portions of the circuit of FIG. 1 for use with analog precharge voltages.

Thus if, as shown in FIG. 5, the system clock $\Phi$ is applied only to the gate electrode of precharge gate 22, and an analog voltage is applied to the drain of precharge gate 22 (i.e. if the connection of FIG. 5 is substituted for precharge gate 22 in FIG. 1), then the circuit of FIG. 1 will initiate an output pulse not for every other trigger pulse, but for every *n*th trigger pulse depending upon the RC constant of capacitor 40 and gate 22, and upon the amplitude of the analog voltage applied to the drain of gate 22. Conversely, by controlling the RC constant of capacitor 42 and gate 20, or by substituting the connection of FIG. 5 for gate 20 and applying an analog voltage to the drain of gate 20, the length of the output pulse can be controlled.

The function of the circuit in the first mentioned instance is as follows: Assuming that the output of the circuit has been placed in the "0" condition (i.e. output $\overline{Q}$ at logic "1" and output Q at logic "0"), capacitor 40 is still essentially discharged. In order for the slave circuit 10 to change states, it is necessary that capacitors 40 be charged to a sufficiently high voltage to drive capacitance 32 above threshold when the trigger pulse enables transfer gate 46.

By properly adjusting the RC constant of MOSFET 22 and capacitor 40 in relation to the pulse length of the system clock $\Phi$ (or the interval between trigger pulses if $\Phi$ is DC) and the analog voltage applied to the drain of MOSFET 22, it is possible to charge capacitor 40 slowly enough that the charge built up in capacitor 40 by the time the next trigger pulse occurs is insufficient to drive capacitance 32 beyond threshold.

It will be noted that while capacitor 40 is charging, capacitor 42 is essentially discharged. In order to prevent capacitance 28 from discharging sufficiently into capacitor 42 during the trigger pulse to cut off MOSFET 26 and charge capacitance 32 above threshold through precharge gate 18, the conductance of transfer gate 44 is kept low enough to prevent the draining of all the charge on capacitance 28 during the duration of the trigger pulse. As a practical matter, the charge on capacitance 28 may drop slightly below threshold during the trigger pulse as long as it's restored sufficiently quickly enough through precharge gate 16 to prevent capacitance 32 from being charged above threshold through precharge gate 18.

Figure 4:
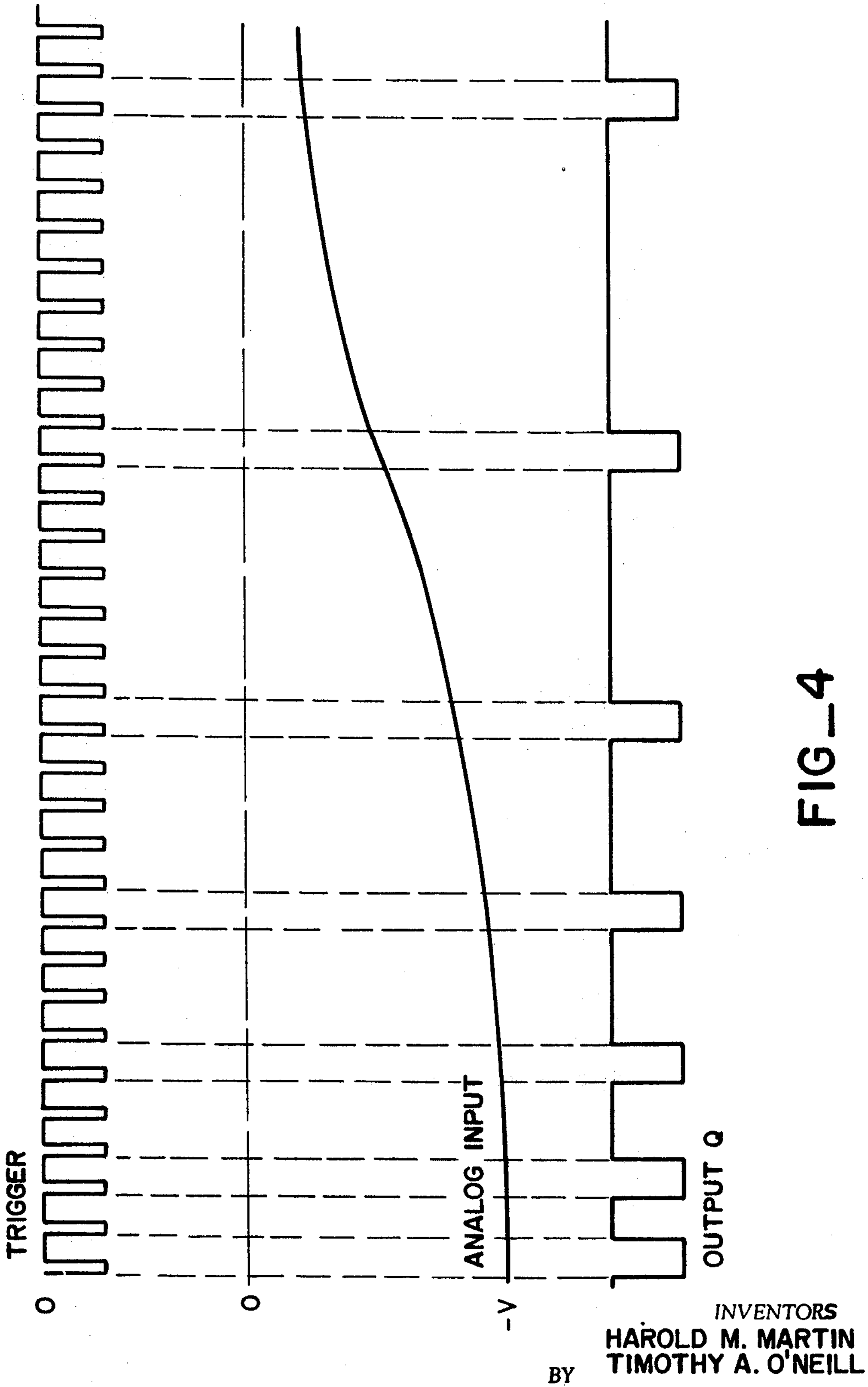
FIG. 4 is time amplitude diagram illustrating the output of the circuit of FIG. 1 when an analog voltage is substituted for one of the system clock inputs on one side of the master circuit of FIG. 1.

The wave forms occurring in the circuit of FIG. 1 as a sinusoidal analog voltage is applied to MOSFET 22 are shown in FIG. 4. The analog voltage may, of course, take any desired form, e.g., a DC voltage, possibly adjustable by a potentiometer, or a sinusoidal or otherwise variable voltage, or a voltage controlled automatically by external control circuitry, to name just a few. Also, the control may relate to the output pulse length, or to the interval between output pulses, or both.

It will be understood that by applying such an appropriate DC analog voltage to the flip-flop 50*a* of FIG. 2 and timing $\Phi_2$ accordingly, the counter of FIG. 2 can be made to count by groups of *n* pulses rather than by ones.

Although any amount of spacing is obtainable with the circuit of this invention, complete accuracy of spacing is obtainable only within reasonable limits due to the exponential nature of the charging curve of capacitor 40. The circuit of this invention when constructed with discrete MOSFETs has been found to function precisely and reliably under normal conditions up to a spacing on the order of about 15 trigger pulses between changes of state of the flip-flop. At greater spacings, the accuracy of the spacing count tends to become increasingly dependent on the quality of the components of the circuit and the environmental parameters involved.

We claim:

1. A flip-flop circuit consisting solely of MOSFETs and capacitive elements and their interconnections, and comprising:

a. a bistable circuit including at least a pair of capacitive elements charged to different potentials;
b. a source of trigger pulses; and
c. means for interchanging the potentials of said capacitive elements upon the occurrence of *n* trigger pulses, *n* being any selectable positive integer.

2. A flip-flop circuit according to claim 1, in which *n* is variable.

3. A flip-flop circuit according to claim 1, in which the change in one direction occurs after *n* trigger pulses and the change in the other direction occurs after *m* trigger pulses, *n* and *m* being different positive integers.

4. A flip-flop circuit according to claim 3, in which either or both *n* and *m* are variable.

5. A MOSFET flip-flop circuit, comprising:

a. a slave circuit including a pair of cross-coupled MOSFETs, the gate electrodes of said cross-coupled MOSFETs constituting the output of said flip-flop circuit;
b. a master circuit including a pair of capacitive means and a pair of MOSFETs for selectively grounding said capacitive means, the gate electrodes of said master circuit MOSFETs being connected to said gate electrodes of said cross-coupled MOSFETs;
c. precharge means for precharging said gate electrodes and said capacitive means;
d. a source of trigger pulses; and
e. transfer gate means enabled by said trigger pulses for transferring capacitive charges between said gates of said MOSFETs and said capacitive means during said trigger pulses.

6. The circuit of claim 5, in which the capacitance of each of said capacitive means is at least an order of magnitude greater than the combined gate and line capacitance of each interconnected pair of said MOSFET gates and their interconnections.

7. The circuit of claim 5, in which said precharge means include precharge gate MOSFETs, and in which the conductance of said cross-coupled and master circuit MOSFETs is substantially greater than the conductance of said precharge gate MOSFETs.

8. The circuit of claim 5, in which said precharge means are energized by clock pulses alternating with said trigger pulses.

9. The circuit of claim 5, in which said precharge means are energized by DC.

10. The circuit of claim 5, further comprising a source of analog voltage, at least one of the precharge means associated with said capacitive means including MOSFET precharge gate means enabled by system clock means, said precharge gate means connecting said source of analog voltage to one of said capacitive means.

11. The circuit of claim 5, further comprising a pair of analog voltage sources, each of said precharge means associated with said capacitive means including MOSFET precharge gate means enabled by system clock means and arranged to connect one of said analog voltage sources to one of said capacitive means.

12. The circuit of claim 5, in which the charging rate of at least one of said capacitive means is such that following its discharge, it does not recharge sufficiently fast to accumulate, in the interval between two of said trigger pulses, enough charge to drive the gate of the cross-coupled MOSFET associated therewith above threshold.

13. A MOSFET binary counter comprising:

a. a plurality of MOSFET flip-flop circuits of ascending order;
b. a source of trigger pulses;
c. a source of timing pulses displaced in time from said trigger pulses;
d. inhibiting gate means interposed between said source of trigger pulses and the inputs of said flip-flop circuits;
e. interconnecting means connecting an output of one of said flip-flop circuits to the gate electrode of the inhibiting gate means of the next flip-flop circuits;
f. timing means blocking said interconnecting means during the occurrence of said trigger pulses; and
g. setting gate means interposed in said interconnecting means of second and higher order and arranged to block said interconnecting means unless all flip-flops of lower order than said one of said flip-flops are in logic "1" condition.

14. The counter of claim 13, further comprising resetting gate means gated by the inverse output of the lowest order one of said flip-flops and connected between said gate electrode of said inhibiting means of the third and higher order ones of said flip-flops and the non inverse output of said lowest-order flip-flop.